US009111319B2

(12) United States Patent
Hofmayer et al.

(10) Patent No.: US 9,111,319 B2
(45) Date of Patent: Aug. 18, 2015

(54) SYSTEM, COMPUTER PROGRAM PRODUCT AND COMPUTER-IMPLEMENTED METHOD FOR SHARING ACADEMIC USER PROFILES AND RANKING ACADEMIC USERS

(75) Inventors: Soren Hofmayer, Wennigsen (DE); Viacheslav Zholudev, Berlin (DE); Ijad Madisch, Berlin (DE); Horst Fickenscher, Berlin (DE); Michael Hausler, Berlin (DE); Alex Tolke, Berlin (DE)

(73) Assignee: ResearchGate GmbH (DE)

( * ) Notice: Subject to any disclaimer, the term of this patent is extended or adjusted under 35 U.S.C. 154(b) by 293 days.

(21) Appl. No.: 13/533,707

(22) Filed: Jun. 26, 2012

(65) Prior Publication Data
US 2013/0346497 A1 Dec. 26, 2013

(51) Int. Cl.
*G06F 15/16* (2006.01)
*G06Q 50/00* (2012.01)
*G06Q 10/10* (2012.01)

(52) U.S. Cl.
CPC .............. *G06Q 50/01* (2013.01); *G06Q 10/105* (2013.01)

(58) Field of Classification Search
CPC  G06F 15/16; G06F 17/3053; G06F 17/30728
USPC ........................................................ 709/204
See application file for complete search history.

(56) References Cited

U.S. PATENT DOCUMENTS 7,031,961 B2    4/2006  Pitkow et al.
7,756,945 B1*   7/2010  Andreessen et al. .......... 709/217
7,801,896 B2    9/2010  Szabo
8,010,460 B2*   8/2011  Work et al. .................... 705/319
8,024,211 B1*   9/2011  Cohen ........................... 705/7.14
8,140,566 B2*   3/2012  Boerries et al. ............... 707/769
2008/0229828 A1* 9/2008  Buschman et al. ............. 73/579
2011/0066954 A1  3/2011  Zuber
2012/0036127 A1  2/2012  Work et al.

FOREIGN PATENT DOCUMENTS

WO     WO-2014/004703 A2    1/2014

OTHER PUBLICATIONS

"International Application Serial No. PCT/US2013/047948, Written Opinion mailed Jan. 14, 2014", 5 pgs.
"International Application Serial No. PCT/US2013/47948, International Search Report mailed Jan. 14, 2014", 2 pgs.

* cited by examiner

*Primary Examiner* — Kevin Bates
*Assistant Examiner* — Nazia Naoreen
(74) *Attorney, Agent, or Firm* — Schwegman Lundberg & Woessner, P.A.

(57) ABSTRACT

A system for sharing academic articles and credential information for a plurality of academic users is described herein. Embodiments of the system, computer program product and computer-implemented method perform a process for gathering data related to the academic user and a process for determining a reputation ranking for the academic user by executing the steps of: creating a user profile for the academic user from attribute information gathered from a user profile prompt, enabling the user profile from the academic user to be viewed by academic and non-academic users and selected for ranking by other academic users, enabling the other academic users to provide a rank selection for the user profile for the academic user according to at least one of research quality, credentials, research articles, and user activity, and determining a reputation ranking for the user profile from the rank selection of the other academic users.

15 Claims, 10 Drawing Sheets

ResearchGate

Search 618  602 612 614 616

Bastian Hofmann
Md PhD
Harvard University  620  601

27.39
RG SCORE

Follow

72 FOLLOWERS | 17 FOLLOWING

CONTRIBUTIONS | INFO

622

Published  604
Unique sequence features of the Adenovirus 31 complete genomic sequence are conserved in clinical isolates.
With Soeren Hofmayer, Ijad Madisch, Sebastian Darr, Fabienne Rehren
View  2
27.39xx Summary / All

610

Publish your research
608

198 FULL-TEXTS      2      I.F.43.07
783 PUBLISHED DATA  7      43
65 REPLIES          43
37 QUESTIONS        9
0 XXX SECRET SAUSE

Published
Phylogeny and primary structure analysis of fiber shafts of all human adenovirus types for rational design of adenoviral gene therapy vectors.
With Soeren Hofmayer, Ijad Madisch, Sebastian Darr, Albert Heim
View Read fulltext

ABOUT     624
Facilitating collaboration has been at the center of our mission. Ans now, we're thrilled to be able to introduce you to Projects, a tool we've built with collaboration and collaboration.
Updated 2 weeks ago

Asked
Which social network analysis methodology would you recommend in order to analyze the actors' level of power and degree of connectedness?
Currently I am working on the application of an social network analysis framework on various East Asian education systems that are all built around hyper competitive exams, in particular college entrance exams ... [more]
View  606

RECENT FOLLOWERS

Answered
Which social network analysis methodology would you recommend in order to analyze the actors' level of power and degree of connectedness?
Currently I am working on the application of an social network analysis framework on various East Asian education systems that are all built around hyper competitive exams, in particular college entrance exams ... [more]
View  2

600

≡  ACTIVITY
📄 PUBLICATIONS
ℹ  INFO

SYSTEM, COMPUTER PROGRAM PRODUCT AND COMPUTER-IMPLEMENTED METHOD FOR SHARING ACADEMIC USER PROFILES AND RANKING ACADEMIC USERS

FIELD OF THE INVENTION

The following invention relates generally to a system for sharing user profiles, and more specifically to a system for searching and sharing user profiles for a plurality of users, such as academic users, e.g., professors, researchers, research clinicians, scientists, etc, and ranking the users for contribution quality and reputation.

BACKGROUND OF THE INVENTION

Currently, there are several social networking sites that allow users to post profiles and content to an online forum, e.g., art work, writing, clippings, photos, etc. However, most of these websites are available for the general public to join, making it difficult to locate relevant user profiles and information, screen service providers and others from the network, and control quality of the postings. Some sites have sought to alleviate the screening and location issues by establishing groups within the social networking site and restricting access for complaints about users that contact people outside their group without prior contact. These methods generally fail in an academic context, however, because a general user may join a group to search for researchers to pose a question to, e.g., an academic researching a new cancer drug, making the site burdensome to researchers in the field. Some sites also attempt to restrict profile searching to people who have similar educational backgrounds, professional backgrounds etc., but such searches may not locate academics in similar research fields from different institutions.

Conventional social networking sites also have issues when it comes to evaluating the quality of profiles and user content. Some sites attempt to alleviate the quality issue by allowing site users to provide positive or negative feedback regarding a particular user, e.g., to "like", to up vote, or to post comments related to the content or user. Unfortunately, this method of user evaluation has serious drawbacks for academic content. For example, there is no way to measure the quality of the user feedback for a particular user, so if content is highly technical or has a limited audience, the feedback may not be an accurate indicator of content quality, or worse, it may be offensive.

A need exists for a method and system that solves the issues identified above.

SUMMARY OF THE INVENTION

One embodiment of the invention is a system for sharing academic user profiles, research articles and credential information for a plurality of academic users. The system comprises a computer having a tangible, non-transitory computer memory, with the non-transitory memory having stored thereon a plurality of computer instructions to perform a process for gathering data related to an academic user and a process for determining a reputation ranking for the academic user. The computer instructions in such an exemplary embodiment execute the steps of creating a user profile for the academic user from attribute information gathered from a user profile prompt displayed on a user computer associated with the academic user, enabling the user profile from the academic user to be viewed by other academic users and a plurality of non-academic users and selected for ranking by other academic users on other user computers associated with the other academic users, enabling the other academic users to provide a rank selection for the user profile for the academic user according to at least one of research quality, credentials, research articles, and user activity, and determining a reputation ranking for the user profile from the rank selections.

Another embodiment of the invention is a computer program product comprised of a series of instructions executable on a computer for performing a process for gathering data related to the academic user and a process for determining a reputation ranking from the academic user. In some embodiments, the computer program product executes the steps of: creating a user profile for the academic user from attribute information gathered from a user profile prompt displayed on a computer display associated with the academic user, enabling the user profile from the academic user to be viewed and selected by other academic users, enabling the other academic user to provide a rank selection for the user profile for the academic user according to at least one of reputation ranking, academic credentials, publication volume, and user activity, and determining a reputation ranking for the user profile from the rank selection of the rank selection.

Another embodiment of the invention is a computer-implemented method comprised of a series of instructions that cause a computer to perform a process for gathering data related to a plurality of academic users and a process for determining a reputation ranking for an academic user. In some embodiments, the method includes the steps of: creating a user profile for the academic user from attribute information gathered from a user profile prompt displayed on a user computer associated with the academic user, enabling the user profile from the academic user to be viewed by other academic users and a plurality of non-academic users and selected for ranking by other academic users on other user computers associated with the other academic users, enabling the other academic users to provide a rank selection for the user profile for the academic user according to at least one of research quality, credentials, research articles, and user activity, and determining a reputation ranking for the user profile from the rank selections.

BRIEF DESCRIPTION OF THE DRAWINGS

So that the features and advantages of the invention may be understood in more detail, a more particular description of the invention briefly summarized above may be had by reference to the appended drawings, which form a part of this specification. It is to be noted, however, that the drawings illustrate only various embodiments of the invention and are therefore not to be considered limiting of the invention's scope as it may include other effective embodiments as well.

FIG. 6C is a GUI displaying a question and a series of user comments according to an embodiment of the invention;

FIG. 6D is a GUI displaying a research article abstract according to an embodiment of the invention.

DETAILED DESCRIPTION

To address the need set forth above, according to one aspect, the invention includes a communications network interface, e.g., a web server and firewall, for interacting with a plurality of academic and non academic users, a database for storing academic user profile data, and an aggregator computer for implementing the functionality of some embodiments of the instant invention. As used herein, the term "academic user" refers to users that engage in academic and/or research activities at, e.g., universities, colleges, research institutions, companies, etc., and the term "academic user profile" refers to the profiles of such persons. The term "non-academic user", as used herein, refers to users that are not "academic users" as described above.

Figure 1:
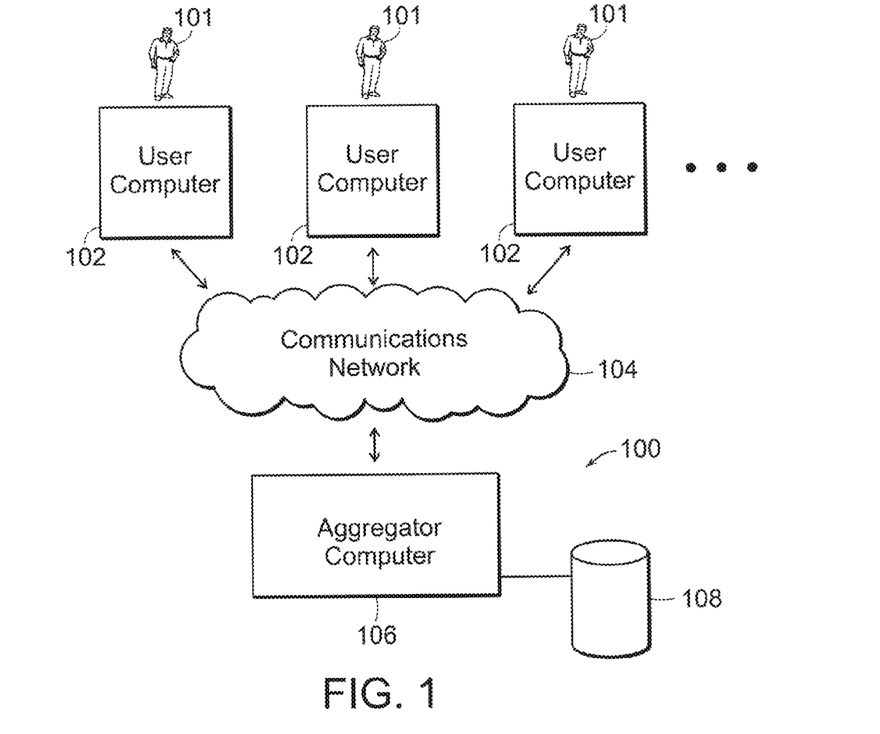
FIG. 1 is a network diagram of an academic user profile system including user computers, a communications network and aggregator computer according to an embodiment of the invention.

More specifically, as can be seen in FIG. 1, the academic user profile shared network site 100 of the instant invention includes user computers 102 associated with users 101, a communications network 104, and an aggregator computer 106 connected to database 108. As one skilled in the art will appreciate, user computers 101 can be any type of computing device, e.g. a desktop, laptop, PDA, smartphone, computer tablet, networked computer display, as well as any other electronic device capable of connecting to the communications network 104 and receiving data from same to enable system interaction with user 101. As one skilled in the art will also appreciate, users 101 may include academic and non-academic users, though in some embodiments non-academic users may have limited access to the system, e.g., non-academic users may only be able to search academic user profiles or may have limited commenting and posting options.

As previously mentioned, the user computers 102 are connected to the aggregator computer 106 via communications network 104, which may be a single communications network or comprised of several different communications networks. As such, communications network 104 can be a public or private network, which can be e.g., any combination of the internet and intranet systems, that allow a plurality of system users to access the academic profile data. For example, communications network 104 can connect all of the system components using the internet, a local area network ("LAN"), e.g., ethernet or WI-FI, or wide area network ("WAN"), e.g., LAN to LAN via internet tunneling, or a combination thereof, and using electrical cable e.g., HomePNA or power line communication, optical fiber, and radio waves, e.g., wireless LAN, to transmit data. As one skilled in the art will appreciate, in some embodiments, user computers 102 may be networked together using a LAN for a university, home, apartment building, etc., but may be connected to the aggregator computer 104 via an internet tunneling to implement a WAN. In other instances, all of the user computers 102 and the aggregator computer 106 may connect using the internet. Still in other implementations, a user may connect to the aggregator using, e.g., wireless LAN and the internet. Moreover, the term "communications network" is not limited to a single communications network system, but may also refer to separate, individual communications networks used to connect the user computers 102 to aggregator computer 106. Accordingly, though each of the user computers 102 and aggregator computer 106 are depicted as connected to a single communications network, such as the internet, an implementation of the communications network 104 using a combination of communications networks is within the scope of the invention.

As one skilled in the art will appreciate, the communications network interfaces with aggregator computer 106, preferably via a firewall (not shown) and web server (not shown) to provide a secure access point for users 101 and to prevent users 101 from accessing the various protected databases in the system. In some embodiments, the firewall may be a network layer firewall i.e., packet filters, application level firewalls, or proxy servers. In other words, in some embodiments, a packet filter firewall can be used to block traffic from particular source IP addresses, source ports, destination IP addresses or ports, or destination service like www or FTP, though a packet filter in this instance would most likely block certain source IP addresses. In other embodiments, an application layer firewall may be used to intercept all packets traveling to or from the system, and may be used to prevent certain users, i.e., users restricted or blocked from system access, from accessing the system. Still, in other embodiments, a proxy server may act as a firewall by responding to some input packets and blocking other packets.

Returning to the figures, database 108 communicates with and uploads data to the user computers via the aggregator computer 106 and communications network 104. As such, database 108 may be, for example, one or more computers, file servers or database servers implemented as network attached storage (NAS), storage area networks (SAN), or direct access storage (DAS), or any combination thereof or of other systems, comprising, e.g., multiple hard disk drives. In some embodiments, the file servers or database servers defining the database 108 may also allow various user computers 102 to directly access, and display data stored thereon. Moreover, each of these file servers or database servers may allow users to upload data to the database. For example, an academic user may upload a photograph, a Curriculum Vitae ("CV"), academic article, and/or raw or processed research data, post blog entries, ask questions, post research updates, etc, to be stored in, e.g., separate file servers or the same file server, in a plurality of databases, tables, or fields in separate portions of the file server memory. Accordingly, as is known in the art, the computer implementing database 108 may have stored thereon database management system, e.g., a set of software programs that controls the organization, storage, management, and retrieval of data in the databases. As one skilled in the art will appreciate, in some embodiments, database 108 may be stored in the aggregator computer memory (to be discussed below). As one skilled in the art will also appreciate, though database 108 is depicted connected to, or as a part of, the aggregator computer 106, not the communications network 104, the database 108 may be, e.g., remote storage or connected to the aggregator computer 106 via a privately networked system.

An aggregator computer 106 will now be described with reference to FIG. 2. As one skilled in the art will appreciate, aggregator computer 106 can be any type of computer, e.g., an application server, or a plurality of computers, comprising a memory 206, a program product 208, a processor 204 and an input/output device ("I/O device") 202. I/O device 202 connects the aggregator computer 106 to a signal from the communications network 104, and can be any I/O device including, but not limited to a network card/controller connected by a PCI bus to the motherboard, or hardware built into the motherboard to connect the aggregator computer 106 to various file servers or database servers implementing database 108.

As can be seen, the I/O device 202 is connected to the processor 204. Processor 204 is the "brains" of the aggregator computer 106, and as such executes program product 208 and works in conjunction with the I/O device 202 to direct data to memory 206 and to send data from memory 206 to the various file servers and communications network. Processor 204 can be, e.g., any commercially available processor, or plurality of processors, adapted for use in an aggregator computer 106, e.g., Intel® Xeon® multicore processors, Intel® micro-architecture Nehalem, AMD Opteron™ multicore processors, etc. As one skilled in the art will appreciate, processor 204 may also include components that allow the aggregator computer 106 to be connected to a display [not shown] and keyboard that would allow, for example, an administrative user direct access to the processor 204 and memory 206.

Memory 206 may store the algorithms forming the computer instructions of the instant invention and data, and such memory 206 may consist of both non-volatile memory, e.g., hard disks, flash memory, optical disks, and the like, and volatile memory, e.g., SRAM, DRAM, SDRAM, etc., as required by embodiments of the instant invention. As one skilled in the art will appreciate, though memory 206 is depicted on, e.g., the motherboard, of the aggregator computer 106, memory 206 may also be a separate component or device, e.g., FLASH memory or other storage, connected to the aggregator computer 106.

Figure 2:
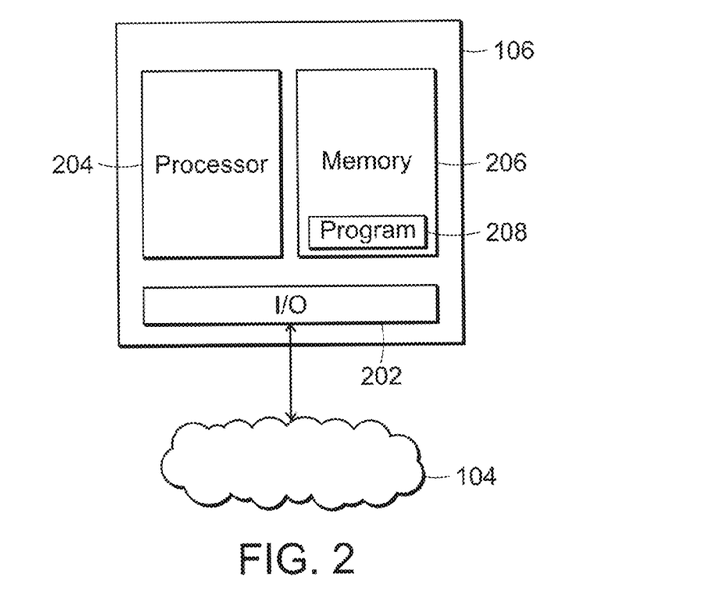
FIG. 2 is an electronic block diagram of an aggregator computer for providing access to the academic user profiles of academic users of the system according to an embodiment of the invention.
Figure 3:
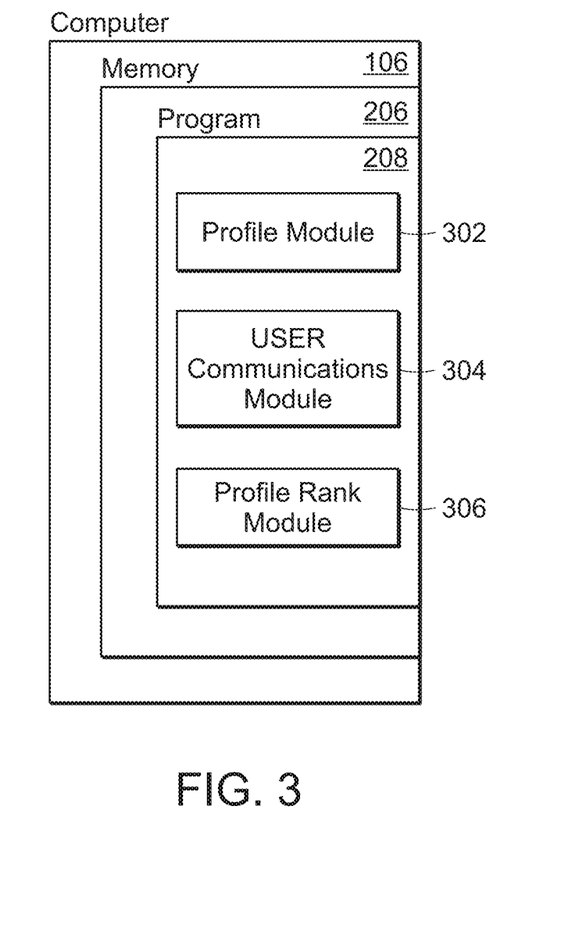
FIG. 3 is a software block diagram of an aggregator computer for providing access to the academic user profiles of academic users, the aggregator computer having a program product in memory thereon including several operation modules according to an embodiment of the invention.

As shown in FIGS. 2 and 3, an embodiment for computer instructions implementing some of the functionality of the instant invention is stored in memory 206, e.g., as a plurality of programming modules. One module, the profile module 302, in some embodiments consists of computer instructions for gathering data from an academic user, including, e.g., researchers, scientists, academics, etc., regardless of whether the academic user is employed by an academic or research institution, to create a user profile for viewing by other system users. The user profile module may obtain from the academic user information such as the academic user's name, address, area of research, academic or research institution in which the user is working, CV, photo, academic articles, etc. The profile module then uses the data to format and create a user profile for the academic user. While in some embodiments, all academic users may have a standard profile format, e.g., color, picture location, CV location, etc., in other embodiments, the user profile module may also allow the academic user to personalize his/her user profile by adding color, changing font and text size, moving locations for pictures, CV, articles, blog posts, etc. As one skilled in the art will appreciate, though some searching and comment functionality may be enabled by the computer instructions for all system users, in a preferred embodiment the academic user profile module is only used by academic users, i.e., only academic user profiles are stored in the database and available for user viewing.

Another module, the user comment module 304, consists of a computer process to enable a plurality of academic users and non-academic users to comment on academic user profiles. For example, an academic user may be able to comment on other academic user profiles, peer papers, research activity, reputation ranking, profile or blog posts, or respond to comments posted on the academic user's profile. In some embodiments, all users, including non-academic users, may be able to comment on, e.g., academic user profiles, research activity, academic article, blog posts, reputation rankings, etc. In other embodiments, non-academic users may be restricted from commenting on the above. Still in other embodiments, academic users that are classified as students may have a separate space in the user comment module to advise other students on the quality of an academic user as a professor, advisor, etc. The user comment module 304 may also include links to "like", up vote, link to postings on an academic user's profile or to an academic user profile, and follow an academic user profile. In some embodiments, the user comment module may also allow a user to reference postings, e.g., by providing a cut and paste function and/or a citing function to the article posted on an academic user's profile.

Returning to FIG. 3, the profile rank module 306 includes processes to rank academic user profiles so that each profile includes a reputation rating. In some embodiments, ranking academic user profiles is restricted to academic users, who rank the academic user profiles according to e.g., the academic user's CV, reputation, blog activity, comment activity, research quality, professional experience with the academic user, and the quality of the academic user's academic publications. In some embodiments, the ranking of an academic user by another academic user is weighted according to the ranking academic user's reputation rating. Still in other embodiments, a reputation ranking may be more or less influenced by student academic user rankings, e.g., students' rankings are given a heavier weight than non-student rankings. In this way, the reputation rating on academic user profiles can more accurately reflect the reliability of an academic user's content, the quality of an academic user's teaching, and/or the quality of the academic user's research.

An exemplary embodiment of the computer program flow for processes implementing the profile module 302, user comment module 304 and profile rank module 306 will now be discussed with reference to FIGS. 4A-4C. As one skilled in the art will appreciate, through the flow diagrams are shown as implemented in a serial configuration, such flow is for simplicity only and should be understood to include various loops and process that may be run concurrently and/or used to implement each of the instructions, or a plurality of the instruction, therein. To implement the profile rank module 306, in step 402, the process "starts" or is called by the computer program/instructions. In step 404, a rank selection provided by an academic user is assigned a ranking weight based upon at least one of the academic user's reputation ranking, academic credentials, publication volume, and user activity. In the next step, 406, the reputation selection of the academic user is multiplied by the ranking weight to create a weighted reputation selection. In step 408, the weighted reputation selection is averaged with the user's reputation ranking to create a new reputation ranking. In step 408, the new reputation ranking is published on the user profile. And, in step 412, the process ends.

Various formula may be used by the profile rank module 306 to perform the steps above. For example, the reputation rating for an academic user may be a combination of an interactive score and traffic score, where for the interactive score:

N is a number of users
T is a set of claimed types
$C_{t,j,i}$ is a value of claim type t between user i and user j
$w_t$ is a weight of the claim type t, where $\Sigma_{t \in T} w_t = 1$
c=0.1—a dumping factor
S=5 is a smoothing factor
Matrix:

$$a_{i,j} = \begin{cases} \sum_{t \in T} \dfrac{w_t \times C_{i,j,t}}{\left(\sum_{1 < i' < N} w_t \times C_{i',j,t}\right) + S} & \text{if } \sum_{t \in T} w_t \times C_{i,j,t} \neq 0 \\ 0 & \text{otherwise} \end{cases}$$

then interactive score is calculated as follows:

$$\text{score}_{INT}^j = \frac{c}{N} + (1-c) \times \left( \sum_{1 < j < N} a_{i,j} \times \text{score}_{INT}^j \right)$$

And, the traffic score is:

$$\text{score}_{TRAF}^j = \frac{\sum_{t \in T'} w_t' \times \log_{d_s}(\mathcal{T}_{i,t} + 1)}{\sum_{t \in T', 1 < t' < N} w_t' \times \log_{d_t}(\mathcal{T}_{t',t} + 1)}$$

where
N is a number of users
T' is a set of traffic contribution types (e.g. publication views)
$w_t'$ is a weight of the traffic type t, where $\Sigma_{t \in T} w_t' = 1$
$d_t$ is a damping of the traffic type t
$T_{i,t}$ is a number of views/downloads/etc. of the type t for user i.

Putting together the equations yields the reputation rating, as a combination of a traffic boost, and interactive score below:

$$b_{TRAF}^i = \min\left(2, e^{\sqrt[4]{10^3 \times \text{score}_{TRAF}^i}}\right)$$

Real score:

$$\text{score}_{REAL}^j = \max\left(0, \text{score}_{INT}^i - \frac{c}{N}\right) * b_{TRAF}^i$$

Display score:

$$\text{score}_{DISPLAY}^i = 10\sqrt{\text{score}_{REAL}^i}$$

As one skilled in the art will appreciate, other steps may be added to those described above to implement other features of the profile rank module, e.g., an instruction to determine whether an academic user is a student user and assigning a ranking weight accordingly or providing a second ranking for teaching quality. Accordingly, though not all such instructions are described herein, all variations in implementation should be considered within the scope of the invention.

An exemplary embodiment of the computer program flow for processes implementing the user profile module 302 is described with reference to FIG. 4B. In step 416, the process "starts" or is called by the computer program. In step 416, a user profile prompt is provided to, e.g., an academic user, which includes a user name field, CV upload option, education information field, research information field, academic institution or research organization field, photo upload option, academic recommendation upload option, and/or academic paper upload option. As one skilled in the art will appreciate, the preceding list of user profile options is exemplary, in some embodiments, the user profile module may also include options to set the user's password and login id, email preferences, contacts, search history log, etc. In some embodiments, the user profile may also include the option to restrict certain areas of the profile to individuals or groups, e.g., to make a research article viewable to the research team or peer review group prior to publication. In other embodiments, the instructions may include determining whether or not the user is an academic user or non-academic user, and providing user profile prompts accordingly. For example, an academic user may be provided a profile prompt that allows the academic user to create an academic profile that can be searched by other users, but the non-academic user is restricted to the creation of only a login id and password. Once the user profile is obtained from the user, the data may be downloaded into the database, e.g., a database for profiles that are pending verification in step 418. In such embodiments, the user profile may be verified, e.g., to determine whether the user is found in the directory of academic or research users, confirmed by a colleague, etc. In other embodiments, academic users may only be able to create profiles if they have been recommended to the system, which would make the verification process unnecessary, and in some other embodiments, a combination of user recommendation and verification may be used as quality control for the academic profile. If verification is part of the download process, in some embodiments, the user may be able to supply limited information until the user is verified as an academic user, e.g., the user may not have the option to upload papers, research, photos, links, etc, to reduce the amount of data held in the pending database. As one skilled in the art will appreciate, once the user profile is verified, the data from the profile is stored in appropriate databases, tables, etc., e.g., a separate database or table for photos, research papers, academic institution information, user comments and blog posts, research, etc, to be discussed further below. And, in step 420, the data for various tables is used to assemble the user profile page, which may also be stored in a separate database or table. As can be seen, the process ends in step 422. As one skilled in the art will appreciate, other computer program steps may be added to those described above to implement other features, e.g., separate prompts for user login id and password creation and user profile information. Accordingly, though not all such instructions are described herein, all variations in implementation should be considered within the scope of the invention.

Returning to the figures, the computer program flow for processes comprising the user communications module 304 will be described with reference to FIG. 4C. In step 424, the process starts by enabling communications links on the user profile page, e.g., options to "like" an academic profile, to "one up" an academic profile, to copy an academic profile, to follow an academic profile, to follow a research field, to comment on the user profile, and/or in some embodiments for the "owner" of the academic profile to post blog entries or respond to other user comments. Once a comment is received, the particular type of comment is stored in the database in step

428. For example, the likes, links, followers, and comments may be stored in the same database in different tables, columns or fields, or may be stored in different databases depending upon the type of content, content size, etc. Academic users are also given the option on the user profile page to comment on articles and link to email addresses for academic users, in step 430. Though shown in series with the previous steps, one skilled in the art will appreciate that the email communication and research article comment options in step 430 may be a parallel process to those above, or for academic users, included as part of the initial profile view page in step 426, i.e., those options are available when a user is identified as an academic user at log in. In step 432, any comments added to a research article are stored in the database. In some embodiments, where the group of users that can see an article or portion of the profile are restricted, the database may stored such comments in separate tables or fields, or in the same table as comments for unrestricted portions with an identifier indicating that the comment is for restricted viewing. In step 434, unrestricted comments are posted on the academic user profile or research paper pages for the academic user, e.g., a comment may be posted with the poster's picture and username. In some embodiments, step 434 may also include instructions to post a copy of the comments provided to academic user profiles on the poster's academic user profile. As one skilled in the art will appreciate, because non-academic users cannot upload photos in some embodiments, even in unrestricted portions of the shared networking site, academic users and non-academic users can be readily distinguished. In step 436, the processes end. As one skilled in the art will appreciate, other computer program steps may be added to those described above to implement other features, the commenting module may allow the user to link to accounts associated with Twitter®, Linkedin® or Facebook®, or allow a user various methods of voting or approving an academic profile or research paper, etc, other than the ones described above. Accordingly, though not all such instructions are described herein, all variations in implementation should be considered within the scope of the invention.

Figure 4A:
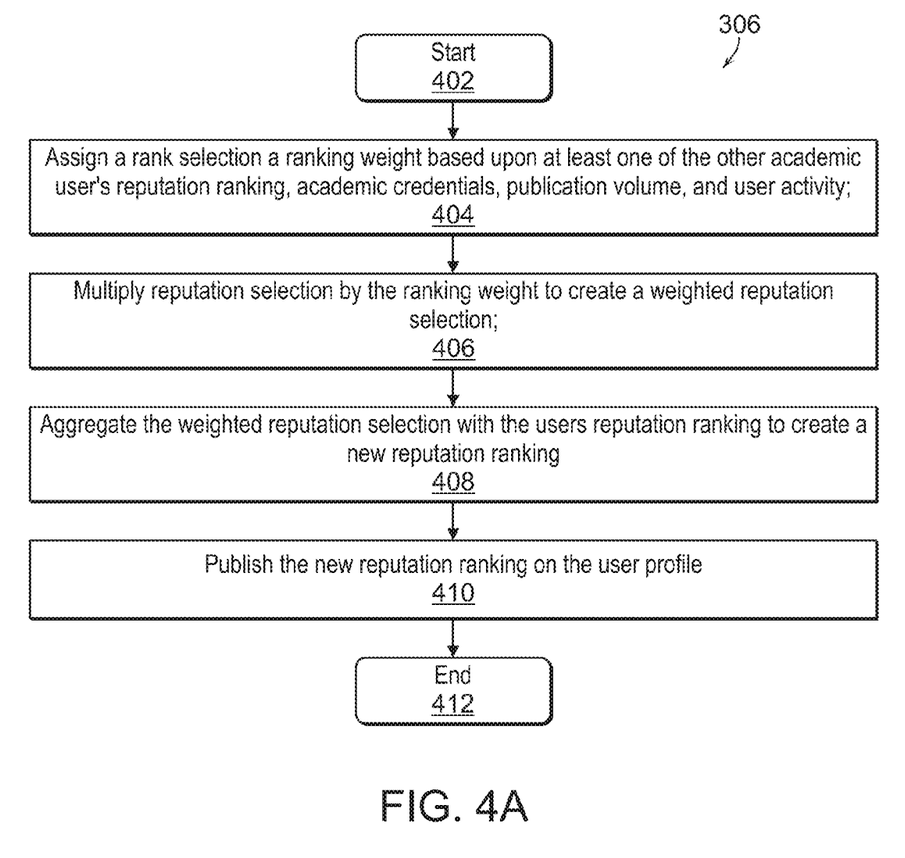
FIG. 4A is a software flow diagram for assigning a reputation ranking to a plurality of user profiles associated with academic users according to an embodiment of the invention.
Figure 4B:
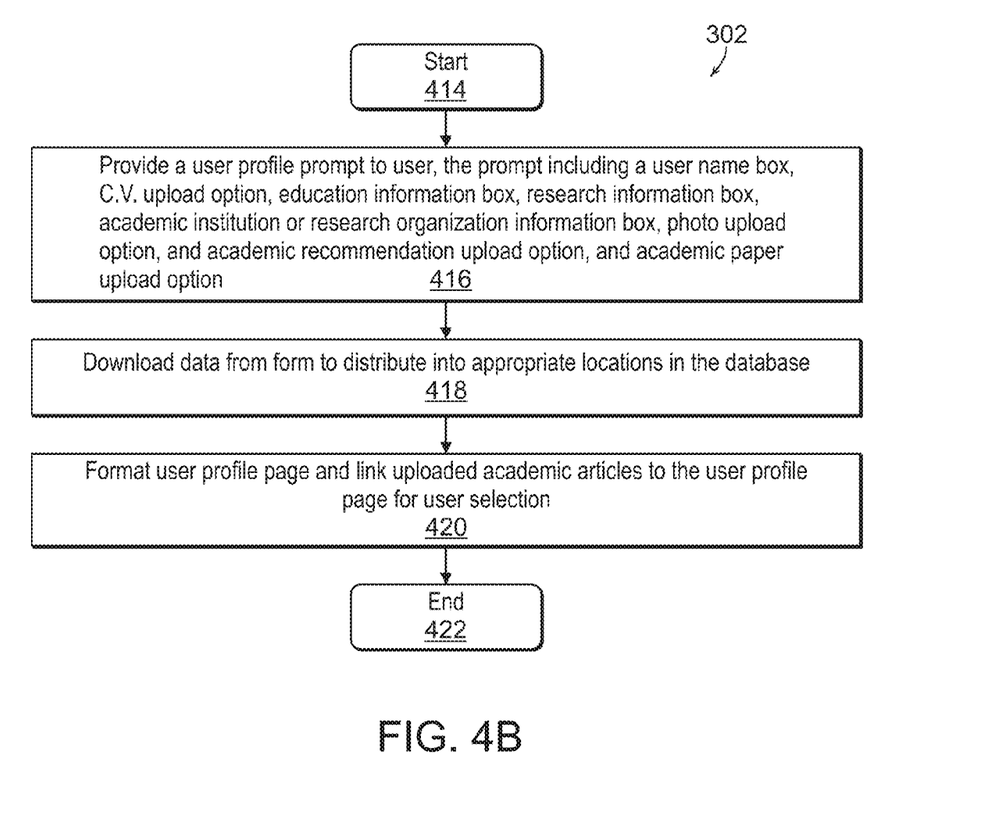
FIG. 4B is a software flow diagram for obtaining user profile information from an academic user according to an embodiment of the invention.
Figure 4C:
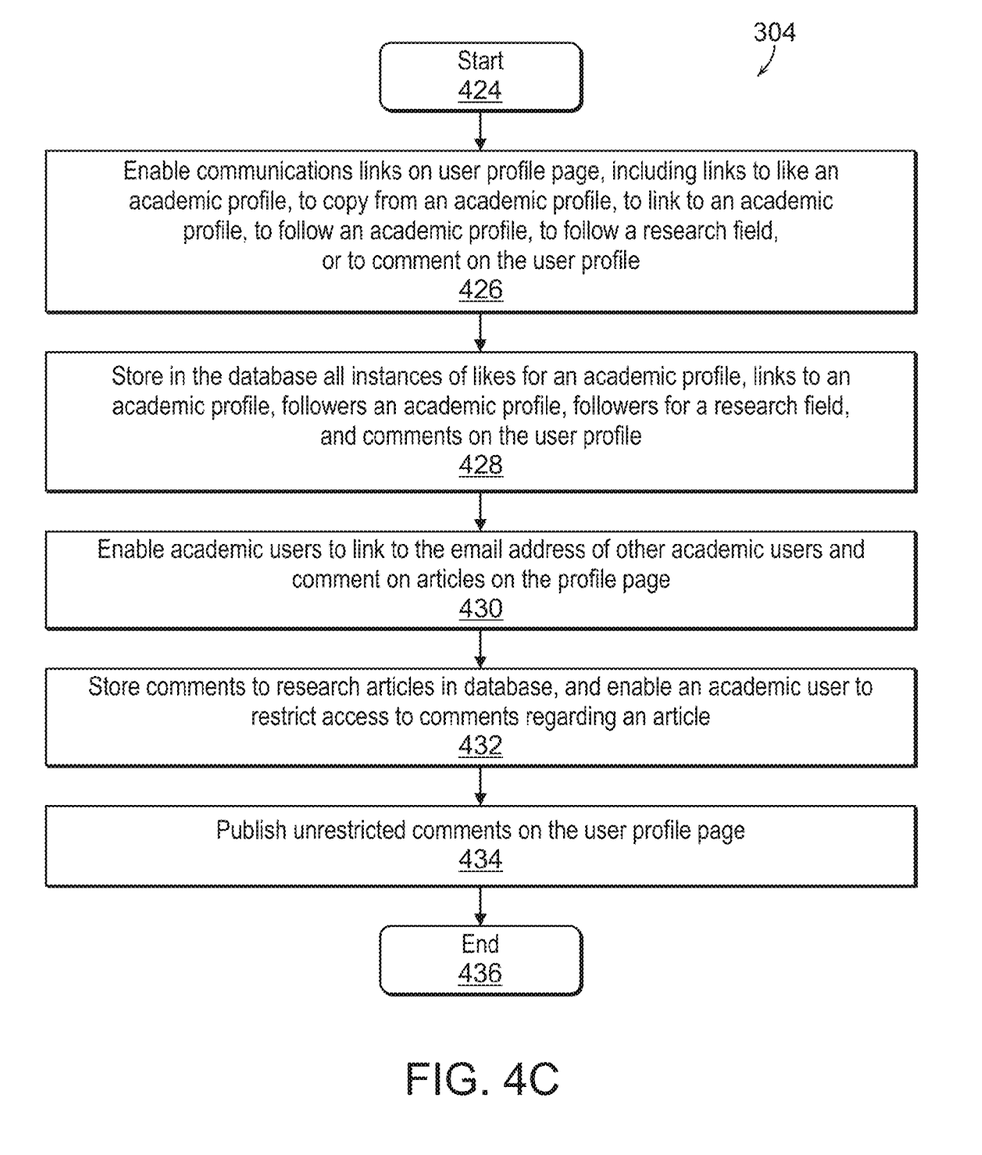
FIG. 4C is a software flow diagram for enabling communication between system users based upon whether or not the system is an academic user or non-academic user, which can be implemented as a loop in some embodiments of the invention.
Figure 5:
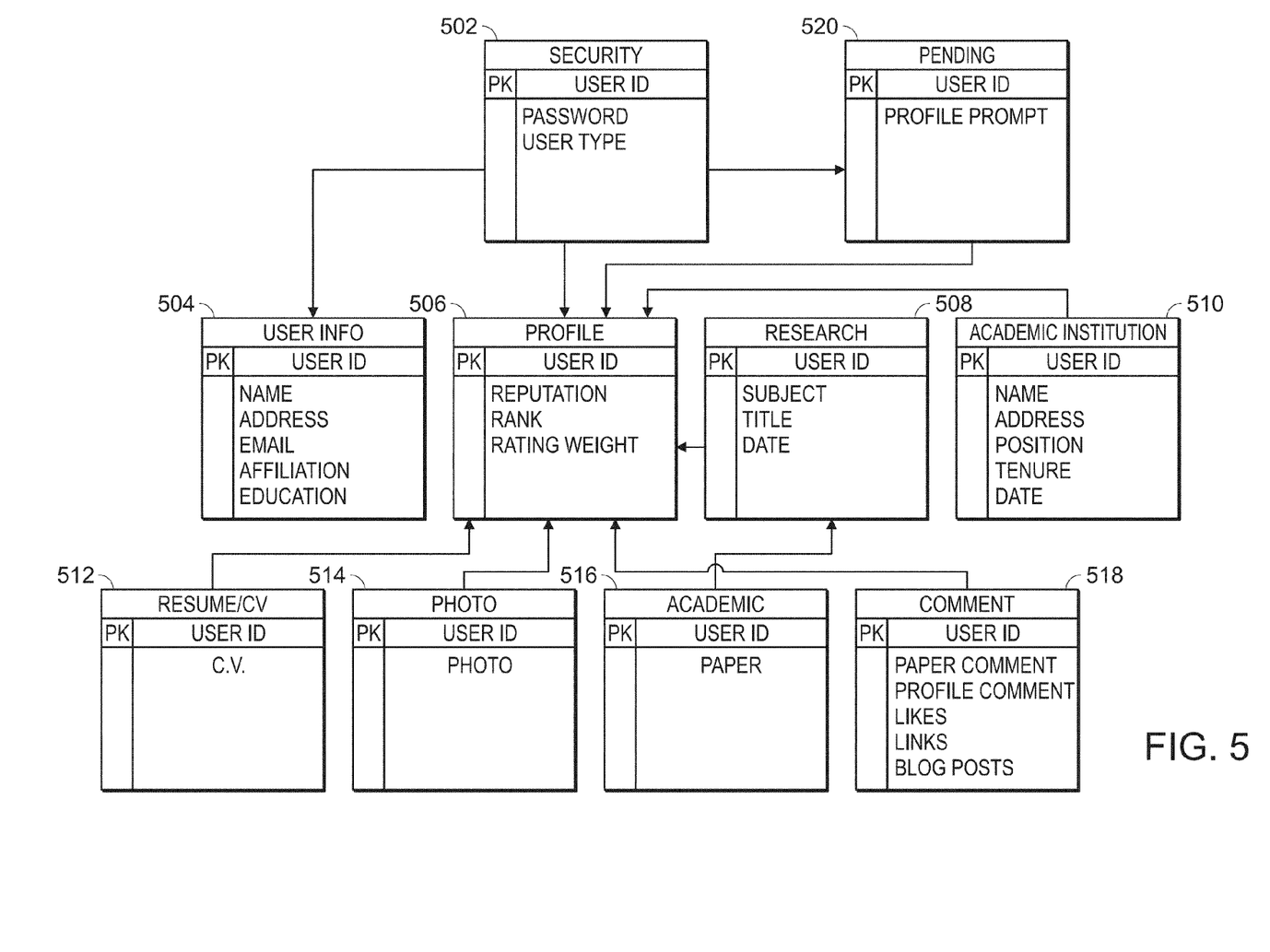
FIG. 5 is a system database diagram for data stored in the memory of an aggregator computer according to an embodiment of the invention.

Turning to FIG. 5, an exemplary database 500, is organized into several tables for each of the steps described in FIGS. 4A-4C, including, for example, a security table 502, a user information table 504, a profile table 506, a research table 508, an academic institution table 510, a CV or resume table 512, a photo table 514, a academic research paper table 516, a comment table 518, and a pending table 520. In an exemplary embodiment, security table 502 may include, e.g., a user identifier ("user ID") as the primary key, and a password and user type stored as separate rows in the table. For the user information table 504, the primary key is the user ID and the rows may be defined, e.g., as the user name, physical address, email address, university or research institution affiliate, and educational level of the student member, e.g., MD, PhD, MS, MA, BS, student, etc, educational background (undergraduate, graduate, post doctoral, etc.). For the profile table 506, the primary key is the user ID, and the rows are defined by the reputation rank of the user profile and the rating weight, i.e., the number used to determine the weight to assign to an academic user's ranking of other academic users. In research table 508, the primary key may be defined by the user ID, with the rows identifying the subject, title, publication date, and author/author(s) associated with the research article. As one skilled in the art will appreciate, the research table 508 stores bibliographic information regarding the research article, while table 516 (discussed below) may be used to store the research article.

Returning to FIG. 5, academic institution table 510 may be used to store information regarding the academic users current school or employer, and may include the user ID as a primary key and the institution name, address, position, tenure, date employed or entered the institution, etc. As one skilled in the art will appreciate, though not depicted in the figures, either the academic institution table 510, or a table similar to academic institution table 510, may be used to store information regarding the educational institutions the academic user attended. In resume/CV table 512, the academic user's CV is stored, and as such the table includes the user ID as a primary key and the CV is included as rows in the table. Similarly, photo table 514 and academic table 516 are organized using the user ID as a primary key, and the storing photos or articles in the rows of the respective tables. In comment table 518, the primary key is also the user ID, but the rows include all types of comments, e.g., paper comments, profile comments, likes, links, blog posts, etc. Finally, in pending column 520, all pending profiles are loaded for approval and/or verification, and as such include the user ID as the primary key and the profile prompt as the row, e.g., the data entered to determine whether a user can create an academic profile or not.

As one skilled in the art will appreciate, each of the relational tables may be used to construct GUIs as described for the program product above that allow a user to interact with the computer program of the instant invention, and exemplary GUIs and their functions will be described with reference to FIGS. 6A-6D.

Figure 6A:
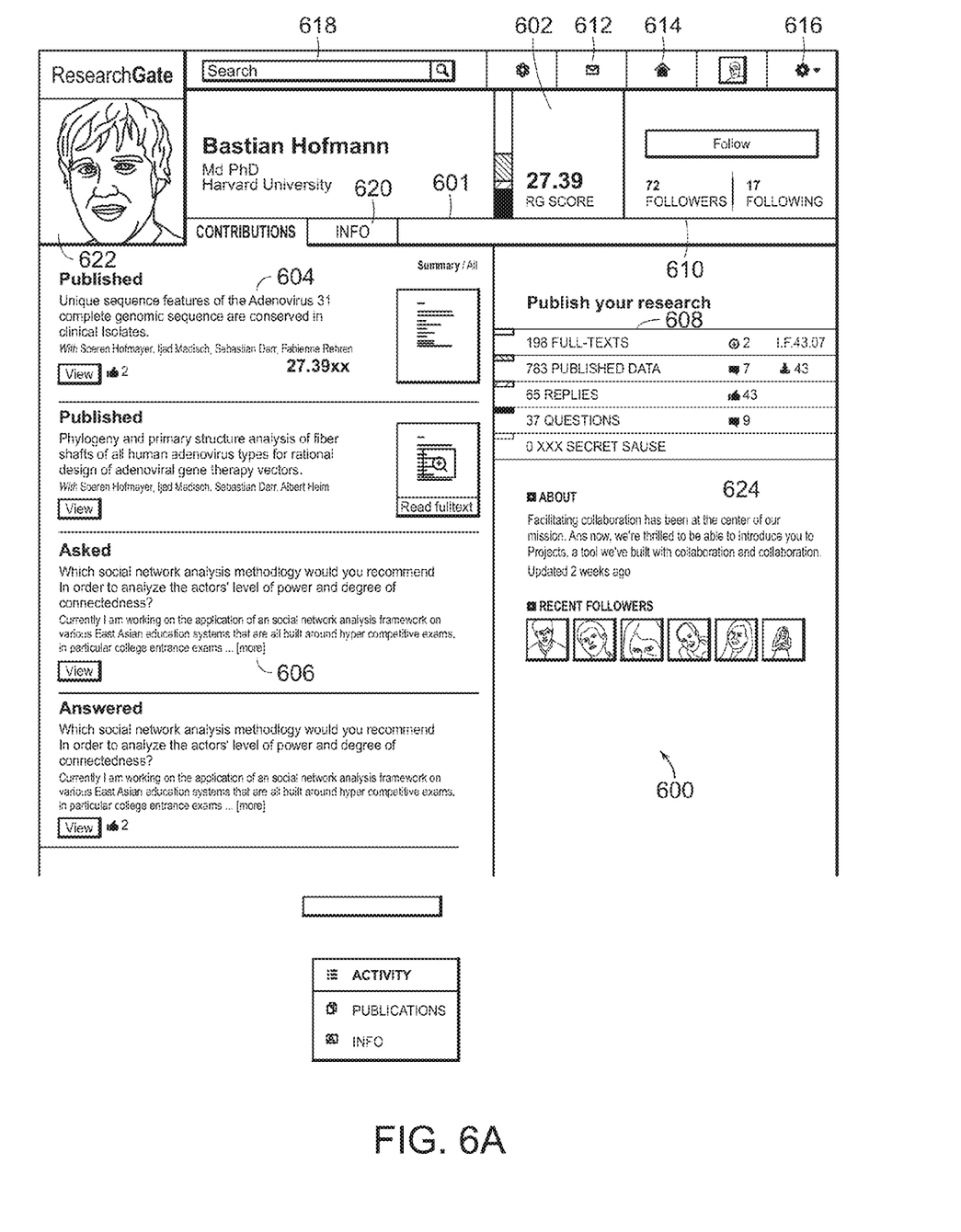
FIG. 6A is a graphical user interface ("GUI") displaying an academic user profile according to an embodiment of the present invention.

FIG. 6A is a graphical user interface ("GUI") displaying an academic user profile according to an embodiment of the present invention. In this embodiment, the academic user profile GUI 600 includes a RG score tab 602, which stores the academic users reputation score; the published article summary and link 604, which stores, e.g., the article abstract and link to full article for viewing; questions posed to the academic user and the associated answers 606, which can be expanded to view multiple comment entries; an activity summary 608, which includes the number of full text articles available, the amount of published data, and questions posed to and answered by the academic users, a link to follow the academic profile 610, which includes the number of followers an academic user has and the number of users following the academic user; an email tab 612, which enables the academic user to email other system users; a home tab 614, which allows an academic user to return to the system home page or, e.g., the academic users own profile; a settings tab 616, which allows the user to change system preferences, e.g., color, photos, username, password, etc; a search prompt 618, which enables a user to search for academic users; an info tab 620, which includes biographic information about the academic profile, e.g., name, address, research field, research institution, undergraduate, graduate and PhD. institutions, etc.; a profile picture, name and institution 622; and a short biographic summary 624 about the academic user and academic user profile. In some embodiments, the academic user's photo, name and institution 622, reputation score tab 602, followers tab 610, email tab 612, home tab 614, settings tab 616 and search prompt 618 can be maintained in one or more profile ribbons 601 at the top of the GUI to be replicated through other GUIs in the system.

Figure 6B:
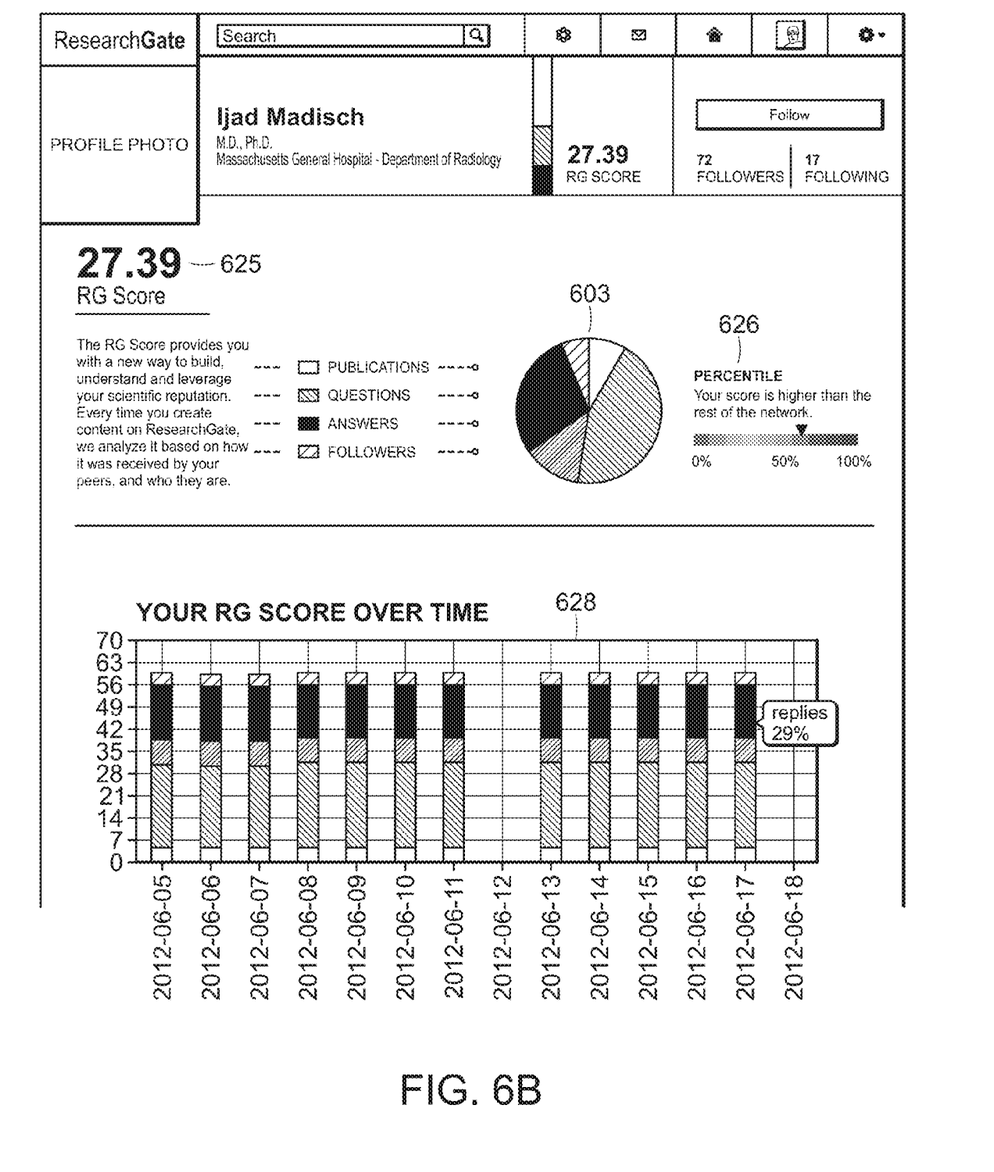
FIG. 6B is a GUI displaying a reputation score according to an embodiment of the invention.

FIG. 6B is a reputation score GUI 603 displaying a reputation score according to an embodiment of the invention. As can be seen, in some embodiments, the reputation score tab 602 expands into the reputation score GUI 603. The reputation score GUI 603 includes a reputation score 625, which may also include an explanation for the reputation score; a percentile rank 626 for the academic user, e.g., the percentage of reputation ratings that the academic profile user's rating exceeds, and a graphic showing the academic user's reputation score over time 628. As one skilled in the art will appreciate, the profile ribbon 601 can be maintained over the reputation score GUI 603.

FIG. 6C is a question GUI 607 that includes a question and a series of user comments according to an embodiment of the invention. In the question GUI 607, for example, the question 606 can be posted by a user and answered by other academic users, and in some embodiments other non-academic users. As such the question GUI 607 can include the question 606, followed by user answers 630. In addition, the users answering the question 606 may be posted in a contributors list 632, which may include the academic user's name, photo, university or institution, and an invitation to follow the particular contributor. The question GUI 607 may also include a link to follow the particular post 634 and a prompt to post a comment to an answer or question 636. As can be seen, the profile ribbon 601 only partly appears on the question GUI 607 so that more comments can appear on the page, but as one skilled in the art will appreciate a full profile ribbon 601 may also appear.

FIG. 6D is a research article GUI 649 displaying a research article abstract according to an embodiment of the invention. As can be seen, the profile ribbon 601 appears at the top of the GUI, the article name and bibliographic information 650 appears below the ribbon; and the abstract 604 from the user profile page may also appear. As one skilled in the art will appreciate, abstract 604 may be abbreviated on the academic user profile GUI 600, but appear in full length form on the research article GUI 649. The research article GUI 649 can also include: a full-text link 640, which links, e.g., to the website for the article publisher; a bookmark option for the publication 644, a resources list 642, which may include a list of the publications in which the article appears; an author list 646, which links to the academic profiles for authors of the article; a comments section 648, which allows a user to post comments to the article; and website links 652 to e.g., Facebook® or Twitter®.

As one skilled in the art will further appreciate, the display pages of FIGS. 6A-6D are exemplary of the GUIs that may be initiated by the computer program of the instant invention to perform the inventive functions herein. Other GUIs may be created that will help with efficiency of data entry, add additional features, or further organize and maintain academic user profiles and research data, and accordingly not all embodiments of such GUIs have been described herein, but will be apparent to one of skill in the art. Accordingly, various GUIs may be used instead of or in addition to the GUIs described herein, and the GUIs are in no way to be considered limiting to the specification and claims, but are used for a descriptive sense only.

Moreover, in the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification, and such modifications and changes are to be considered equivalents and part of this disclosure.

What is claimed is:

1. A system for sharing academic user profiles, research articles and credential information for a plurality of academic users, the system comprising:
   a computer having a tangible, non-transitory computer memory, the non-transitory memory having stored thereon a plurality of computer instructions to perform a process for gathering data related to academic users and a process for determining reputation rankings for the academic users, the computer instructions executing the steps of:
   for each user, determining whether the user is an academic user or a non-academic user,
   creating an academic user profile for each of the academic users from attribute information gathered from a user profile prompt displayed on user computers associated with the academic users,
   allowing the academic users to upload academic articles,
   enabling the academic user profiles to be viewed by both other academic users and non-academic users,
   allowing each of the academic users to comment on the academic articles uploaded by other academic users while restricting the non-academic users from commenting on the articles,
   enabling email communications between the academic users while restricting the non-academic users from emailing the academic users,
   enabling the academic user profile of each academic user to be selected for ranking by other academic users and enabling the other academic users to provide rank selections for the academic user profile according to at least one of research quality, credentials, research articles, and user activity of the academic user associated with the academic user profile,
   assigning each of the rank selections a ranking weight based upon at least one of academic credentials or publication volume of the respective selecting academic user and multiplying the rank selection by the ranking weight to create a weighted rank selection, and
   determining reputation rankings for the academic user profiles from the weighted rank selections.

2. The system of claim 1, wherein the computer instructions further execute the step of allowing the academic users to reference the academic articles uploaded by other academic users by providing a reference prompt including the academic article title, publication date, publisher, and author names.

3. The system of claim 1, wherein the computer instructions further execute the step of creating a user profile search prompt, the user profile search prompt being accessible to academic users and non-academic users, wherein non-academic users are restricted from creating user profiles.

4. The system of claim 1, wherein the computer instructions further execute the step of:
   publishing the reputation rankings on the user profiles.

5. The system of claim 1, wherein the computer instructions further execute the step of:
   formatting the user profiles for display to the other users with display selection prompts,
   wherein the display selection prompts include selections for at least one of: liking the user profile, following the user profile, copying information from the user profile, and linking the user profile to an external webpage.

6. A non-transitory computer-readable medium storing a computer program product comprised of a series of instructions executable on a computer, the computer program product performing a process for gathering data related to a plurality of academic users and a process for determining a reputation ranking an academic user, the computer program product implementing the steps of:

for each user, determining whether the user is an academic user or a non-academic user,     creating an academic user profile for each of the academic users from attribute information gathered from a user profile prompt displayed on user computers associated with the academic users,     allowing the academic users to upload academic articles,     enabling the academic user profiles to be viewed by both other academic users and non-academic users,     allowing each of the academic users to comment on the academic articles uploaded by other academic users while restricting the non-academic users from commenting on the articles,     enabling email communications between the academic users while restricting the non-academic users from emailing the academic users,     enabling the academic user profile of each academic user to be selected for ranking by other academic users and enabling the other academic users to provide rank selections for the academic user profile according to at least one of research quality, credentials, research articles, and user activity of the academic user associated with the academic user profile,     assigning each of the rank selections a ranking weight based upon at least one of academic credentials or publication volume of the respective selecting academic user and multiplying the rank selection by the ranking weight to create a weighted rank selection, and     determining reputation rankings for the academic user profiles from the weighted rank selections.

7. The computer program product of claim 6, further including instructions for allowing the academic users to reference the academic articles uploaded by other academic users by providing a reference prompt including the academic article title, publication date, publisher, and author names.

8. The computer program product of claim 6, further including instructions for creating a user profile search prompt, the user profile search prompt being accessible to academic users and non-academic users, wherein non-academic users are restricted from creating user profiles.

9. The computer program product of claim 6, further including instructions for:

publishing the new reputation rankings on the user profiles.

10. The computer program product of claim 6, further including instructions for:

formatting the user profiles for display to the other academic users with display selection prompts,     wherein the display selection prompts include selections for at least one of liking the user profile, following the user profile, copying information from the user profile, and linking the user profile to an external webpage.

11. A computer-implemented method comprised of a series of instructions that cause a computer to perform a process for gathering data related to a plurality of academic users and a process for determining a reputation ranking for an academic user, the method including the steps of:

for each user, determining whether the user is an academic user or a non-academic user,     creating an academic user profile for each of the academic users from attribute information gathered from a user profile prompt displayed on user computers associated with the academic users,     allowing the academic users to upload academic articles,     enabling the academic user profiles to be viewed by both other academic users and non-academic users,     allowing each of the academic users to comment on the academic articles uploaded by other academic users while restricting the non-academic users from commenting on the articles,     enabling email communications between the academic users while restricting the non-academic users from emailing the academic users,     enabling the academic user profile of each academic user to be selected for ranking by other academic users and enabling the other academic users to provide rank selections for the academic user profile according to at least one of research quality, credentials, research articles, and user activity of the academic user associated with the academic user profile,     assigning each of the rank selections a ranking weight based upon at least one of academic credentials or publication volume of the respective selecting academic user and multiplying the rank selection by the ranking weight to create a weighted rank selection, and     determining reputation rankings for the academic user profiles from the weighted rank selections.

12. The computer-implemented method of claim 11, further including the step of:

allowing academic users to reference the academic articles uploaded by other academic users by providing a reference prompt including the academic article title, publication date, publisher, and author names.

13. The computer-implemented method of claim 11, further including the step of creating a user profile search prompt, the user profile search prompt being accessible to academic users and non-academic users,     wherein non-academic users are restricted from creating user profiles.

14. The computer-implemented method of claim 11, further including the step of:

publishing the new reputation rankings on the user profiles.

15. The computer-implemented method of claim 11, further including the step of:

formatting the user profiles for display to the other academic users with display selection prompts,     wherein the display selection prompts include selections for at least one of liking the user profile, following the user profile, copying information from the user profile, and linking the user profile to an external webpage.

\* \* \* \* \*